J. M. L. SPANGENBERG.
TRANSPORT LORRY.
APPLICATION FILED OCT. 19, 1914.
1,138,422.
Patented May 4, 1915.
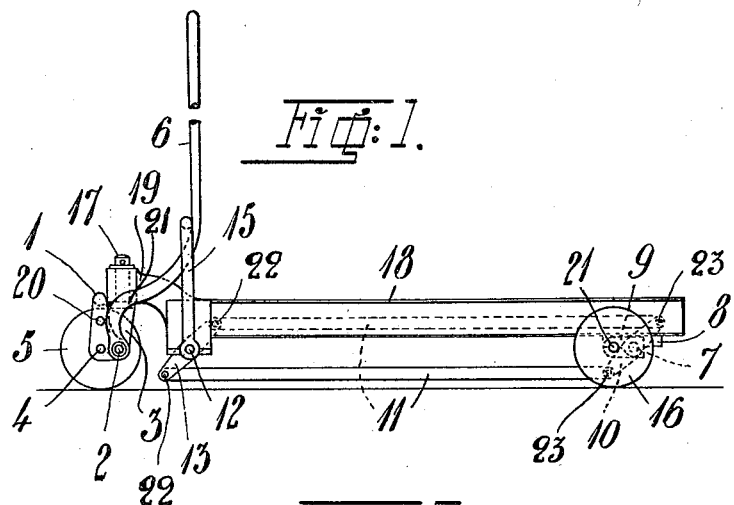
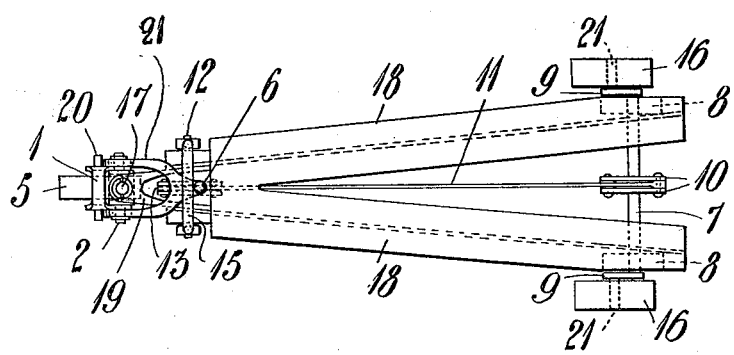
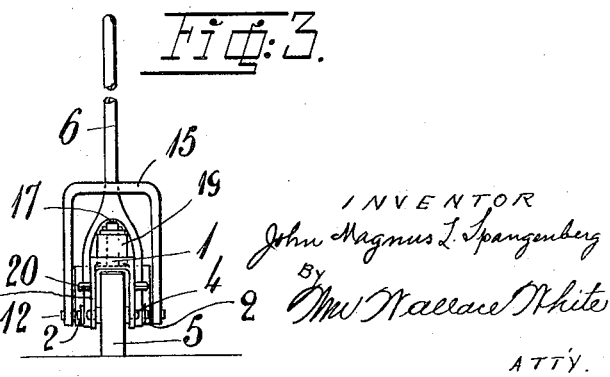
INVENTOR
John Magnus L. Spangenberg
By
Mr Wallace White
ATTY.
WITNESSES:
John C Sanders
Albert F Heuman

UNITED STATES PATENT OFFICE.

JOHN MAGNUS LARSON SPANGENBERG, OF FORSHAGA, SWEDEN.

TRANSPORT-LORRY.

1,138,422.  Specification of Letters Patent.  Patented May 4, 1915.

Application filed October 19, 1914. Serial No. 867,437.

*To all whom it may concern:*

Be it known that I, JOHN MAGNUS LARSON SPANGENBERG, subject of the King of Sweden, residing at Forshaga, in the Kingdom of Sweden, have invented certain new and useful Improvements in Transport-Lorries.

The present invention refers to a transport lorry with a load platform that may be raised and lowered. Such transport lorries consisting of a fixed or rigid lower portion, upon which an upper lifting platform may glide on a sloping surface, have been known previously.

According to the present invention, however, the entire frame of the lorry or the top of the same may be raised and lowered in relation to the axles of the wheels in order that the lorry, when the top is in its lowest position, can be pushed below the load that has been placed upon some suitable support or platform, whereupon by raising the top member of the lorry, the load is lifted from its support or platform and removed with the lorry.

In order that the invention may be more readily understood reference will now be made to the accompanying drawings which illustrate a lorry according to the present invention, and in which:

Figure 1 is a side elevation, and Fig. 2 is a plan. Fig. 3 is a front view of the anterior part of the lorry with its operating device.

According to this form of construction the lorry rests on three wheels, one front wheel 5 and two back wheels 16. The front wheel runs in bearings on a spindle 4, which is connected with a yoke shaped part 1 gripping the wheel, and which furthermore at each side is provided with a pin 2 eccentrically arranged in relation to the spindle 4. These pins 2 are journaled in a fork shaped part 3, the top portion of which forms a vertical axle 7 which is journaled in a part 19 supporting the front part of the lorry-top 18. 6 is a handlever, the lower fork shaped part 21 of which is pivotally connected with the spindles 2. The lower part 21 of this lever is bent nearly to the form of an S and rests against pins 20 attached to each side of the part 1 in such a manner that when the upper end of the lever 6 is moved forward, the part 1 turns round the spindle or axle 4, which results in the pins 2 and with them also the front portion of the lorry-frame, being raised in relation to the axle 4 of the wheel 5. When the lever 6 is being moved forward a yoke 15 gripping over the lever 6 is also moved forward. This yoke 15 is rigidly connected with an axle 12 pivotally attached to the lorry-top member or frame 18. To this axle 12 a two-armed lever 13 is rigidly attached. The two ends of the lever 12 are by means of pins 22, 23 and the link bars 11 pivotally connected with the corresponding ends of a two-armed lever 10 rigidly attached to the other wheel axle 7. The said wheel axle 7, which is in the shape of a crank shaft runs in bearings 8, which are connected with the frame 18 and said axle 7 is at its end provided with crank pins or spindles 21 extending from the lever formed parts 9 of the axle. The rear wheels 16 are as shown by the drawing supported by said spindles 21. When in the above described manner the yoke 15 by means of the lever 6 is moved forward, the axle 12 is thus also made to turn and by this also through the intermediation of the doublearmed levers 13 and 10 and the connecting link bars 11 the axle 7 is turned an equally large angle as the axle 12, *i. e.* if the lever 6 is moved forward from the position shown in the drawing into a horizontal position the axles 12 and 7 will be turned through an angle of about 90°. In this manner the axle 7 is made to rise in relation to the crank spindles 21, upon which the wheels are run, so that the rear part of the lorry platform or top is raised simultaneously with the front part.

If the crank members 9 are equally long with the space between the spindles 2 and 4, or in other words the crank member of the front wheel, the front and back part of the lorry top are raised or lowered equally, as the case may be, when the lever 6 is brought forward into a horizontal position or carried upward into a vertical position respectively.

It will no doubt be quite apparent that details of the form of construction shown by way of an example can be varied, without departing from the main idea of the invention.

If it is desired to transport with this lorry any load such as for example a parcel of paper or wood pulp, for which purpose it is particularly suitable, the lorry, with the top member 12 in its lowest position is pushed under the load which for this purpose has been deposited upon a suitable platform or support, which is for example 1⅖ inches higher than the upper surface of the top member 12 in the said position, whereupon the top member, forming the lorry frame is raised by bringing the lever 6 forward sufficiently for the load to be lifted from its support or bed so that it rests entirely upon the lorry frame, whereupon the load resting upon the lorry is transported elsewhere.

Having thus described my invention, I declare, that what I claim is:—

1. In a transport lorry of the kind herein described a lorry frame the one end of which is supported by two wheels each supported by the ends of a crank shaft the middle portion of which is pivotally connected to said frame, the other end of said frame being supported by one wheel through the intermediation of a vertical shaft the lower part of which is fork shaped, the lower ends of said fork shaped part being pivotally connected with spindles eccentrically arranged in relation to the axle of the wheel and attached to a part in which the axle of the wheel runs, and a handlever adapted to be operated in such a way that the last part may be turned on the axle of the last named wheel and means by which the first named shaft is turned when said lever is operated.

2. In a transport lorry of the kind herein described a lorry frame the one end of which is supported by two wheels each supported by the ends of a crank shaft the middle portion of which is pivotally connected to said frame, the other end of said frame being supported by one wheel through the intermediation of a vertical shaft the lower part of which is fork shaped, the lower ends of said fork shaped part being pivotally connected with spindles eccentrically arranged in relation to the axle of the wheel and attached to a part in which the axle of the wheel runs, and a handlever adapted to be operated in such a way that the last part may be turned on the axle of the last named wheel and means by which the first named shaft is turned when said lever is operated, said means consisting of a horizontal shaft on which is rigidly fastened a fork shaped member coöperating with said lever when turned forward, a two-armed lever fastened to said shaft, link bars by which each end of the said two-armed lever is pivotally connected with corresponding ends of a two-armed lever rigidly fastened to the first named shaft.

In witness whereof I have hereunto set my hand in presence of two witnesses.

JOHN MAGNUS LARSON SPANGENBERG.

Witnesses:
JOHN THALCIR,
THUZ. BYTTNAZ.

Copies of this patent may be obtained for five cents each, by addressing the "Commissioner of Patents, Washington, D. C."